(12) United States Patent
Yamada et al.

(10) Patent No.: US 11,788,165 B2
(45) Date of Patent: Oct. 17, 2023

(54) HOT-BAND ANNEALING EQUIPMENT, HOT-BAND ANNEALING METHOD AND DESCALING METHOD FOR SI-CONTAINING HOT ROLLED STEEL SHEET

(71) Applicant: JFE Steel Corporation, Tokyo (JP)

(72) Inventors: Goki Yamada, Tokyo (JP); Yoshimitsu Harada, Tokyo (JP); Takahiro Takatsu, Tokyo (JP); Yukihiro Matsubara, Tokyo (JP); Yuta Tamura, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 56 days.

(21) Appl. No.: 17/506,076

(22) Filed: Oct. 20, 2021

(65) Prior Publication Data

US 2022/0033928 A1    Feb. 3, 2022

Related U.S. Application Data

(62) Division of application No. 16/343,217, filed as application No. PCT/JP2017/036766 on Oct. 11, 2017, now abandoned.

(30) Foreign Application Priority Data

Oct. 19, 2016    (JP) ................. 2016-205194

(51) Int. Cl.
*C21D 9/46* (2006.01)
*C22C 38/02* (2006.01)
(Continued)

(52) U.S. Cl.
CPC .............. *C21D 9/46* (2013.01); *C21D 1/34* (2013.01); *C21D 1/82* (2013.01); *C21D 8/1261* (2013.01);
(Continued)

(58) Field of Classification Search
CPC .......... C21D 9/46; C21D 9/0062; C22C 38/02
See application file for complete search history.

(56) References Cited

U.S. PATENT DOCUMENTS 2,892,744 A    6/1959   Myers
4,081,296 A    3/1978   Janatka et al.
(Continued)

FOREIGN PATENT DOCUMENTS

CN    102325907 A    1/2012
EP      2708609 A1    3/2014
(Continued)

OTHER PUBLICATIONS

Chinese Office Action for Chinese Application No. 201780063342.X, dated May 15, 2020, with English Search Report, 10 pages.
(Continued)

*Primary Examiner* — Scott R Kastler
(74) *Attorney, Agent, or Firm* — RATNERPRESTIA

(57) ABSTRACT

Provided is a hot-band annealing method comprising subjecting a Si-containing hot rolled steel sheet, having an oxidized scale formed on a surface of the steel sheet by hot rolling, to hot-band annealing with a hot-band annealing equipment provided with a heating zone, a soaking zone, a cooling zone, and a rapid heating device at an upstream side of the heating zone and/or in an inlet side of the heating zone, wherein the hot rolled steel sheet is heated by not lower than 50° C. at a heating rate of not less than 15° C./s by using the rapid heating device to improve a descaling property. Also, provided is a descaling method characterized by subjecting the Si-containing hot rolled steel sheet, after the hot-band annealing, to descaling only by pickling without requiring mechanical descaling or heating the steel sheet in the pickling process.

10 Claims, 2 Drawing Sheets

(51) Int. Cl.
  *C21D 1/34* (2006.01)
  *C21D 8/12* (2006.01)
  *C23G 1/08* (2006.01)
  *C21D 9/60* (2006.01)
  *C22C 38/00* (2006.01)
  *C21D 1/82* (2006.01)
  *C21D 9/62* (2006.01)
  *C21D 9/00* (2006.01)
  *C21D 1/40* (2006.01)
  *C21D 1/42* (2006.01)

(52) U.S. Cl.
  CPC ......... *C21D 8/1277* (2013.01); *C21D 9/0062* (2013.01); *C21D 9/60* (2013.01); *C21D 9/62* (2013.01); *C22C 38/00* (2013.01); *C22C 38/02* (2013.01); *C23G 1/08* (2013.01); *C21D 1/40* (2013.01); *C21D 1/42* (2013.01); *C21D 8/12* (2013.01); *Y02P 10/25* (2015.11)

(56) References Cited

U.S. PATENT DOCUMENTS

| | | | |
|---|---|---|---|
| 5,725,696 | A | 3/1998 | Maresch et al. |
| 5,885,371 | A | 3/1999 | Komatsubara et al. |
| 10,053,749 | B2 | 8/2018 | Park et al. |
| 10,072,318 | B2 | 9/2018 | Fukunaga et al. |
| 11,066,722 | B2 | 7/2021 | Imamura et al. |
| 2002/0102178 | A1 | 8/2002 | Hiramatsu et al. |
| 2010/0101690 | A1 | 4/2010 | Koga et al. |
| 2011/0252849 | A1 | 10/2011 | Park et al. |
| 2013/0074996 | A1 | 3/2013 | Omura et al. |
| 2015/0013847 | A1 | 1/2015 | Hei et al. |
| 2015/0243418 | A1 | 8/2015 | Zhang et al. |
| 2015/0357101 | A1* | 12/2015 | Zaizen ................ C21D 8/1222 148/111 |
| 2018/0030558 | A1 | 2/2018 | Okubo et al. |
| 2018/0355454 | A1 | 12/2018 | Okubo et al. |

FOREIGN PATENT DOCUMENTS

| | | | |
|---|---|---|---|
| EP | 2894232 | A1 | 7/2015 |
| EP | 2960345 | A1 | 12/2015 |
| EP | 3428293 | B1 | 1/2019 |
| JP | 57114614 | A | 7/1982 |
| JP | 6179790 | A | 4/1986 |
| JP | 05214444 | A | 8/1993 |
| JP | 062032 | A | 1/1994 |
| JP | 08170159 | A | 7/1996 |
| JP | 08291379 | A | 11/1996 |
| JP | 0978273 | A | 3/1997 |
| JP | 10140243 | A | 5/1998 |
| JP | 2002173742 | A | 6/2002 |
| JP | 2002361314 | A | 12/2002 |
| JP | 2011219793 | A | 11/2011 |
| JP | 2012514131 | A | 6/2012 |
| JP | 2013127101 | A | 6/2013 |
| JP | 2015511995 | A | 4/2015 |
| JP | 2015200002 | A | 11/2015 |
| RU | 2112812 | C1 | 6/1998 |
| RU | 2414513 | C1 | 3/2011 |
| RU | 2532539 | C2 | 11/2014 |
| RU | 2591788 | C2 | 7/2016 |
| WO | 2016136095 | A1 | 9/2016 |
| WO | 2017086036 | A1 | 5/2017 |
| WO | 2017098800 | A1 | 6/2017 |

OTHER PUBLICATIONS

Extended European Search Report for European Application No. 17861698.3, dated Oct. 9, 2019, 10 pages.
International Search Report and Written Opinion for International Application No. PCT/JP2017/036766, dated Jan. 16, 2018, 7 pages.
Japanese Office Action for Japanese Application No. 2016-205194, dated Feb. 6, 2019, with Concise Statement of Relevance of Office Action, 5 pages.
Japanese Office Action for Japanese Application No. 2016-205194, dated Aug. 14, 2019, with Concise Statement of Relevance of Office Action, 6 pages.
Japanese Office Action for Japanese Application No. 2016-205194, dated Jan. 15, 2020, with Concise Statement of Relevance of Office Action, dated Jan. 15, 2020, 6 pages.
Korean Office Action for Korean Application No. 2019-7009164, dated Jul. 22, 2020, with Concise Statement of Relevance of Office Action, 6 pages.
Russian Office Action for Russian Application No. 2019115127, dated Dec. 27, 2019, with translation, 14 pages.
Entire patent prosecution history of U.S. Appl. No. 16/343,217, filed Apr. 18, 2019, entitled, "Hot-Band Annealing Equipment, Hot-Band Annealing Method and Descaling Method for Si-Containing Hot Rolled Steel Sheet."
Béranger G. et al., "Pickling", Le Livre De L'Acier (The Book of Steel), 1994, 8 pages, Translation of the relevant parts of Exhibit D9, Chapter 24.
European Notice of Opposition for European Application No. 3530762, dated May 15, 2023 with translation, 38 pages.

* cited by examiner

FIG.1(a) Picture of cross-section of scale layers
FIG.1(b) Schematic view of cross-section of scale layers
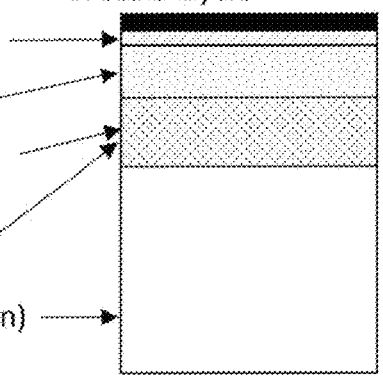
$\left\{\begin{array}{l}Fe_2O_3 \\ Fe_3O_4\end{array}\right\}$
FeO
$Fe_2SiO_4$ (fayalite)
$(Al_2O_3)$
Fe (base iron)
FIG.2(a) Equipment line of conventional method
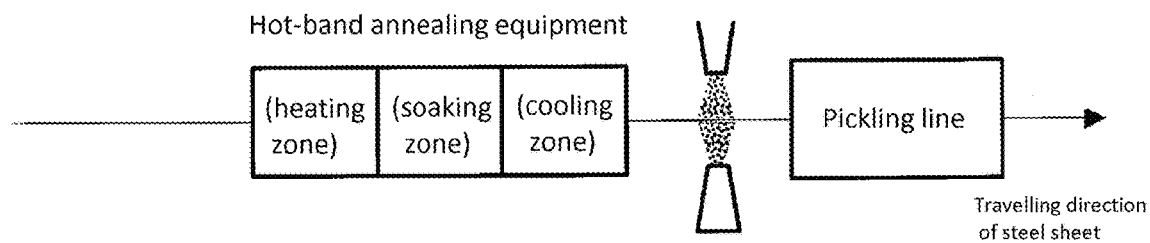
FIG.2(b) Equipment line of present invention
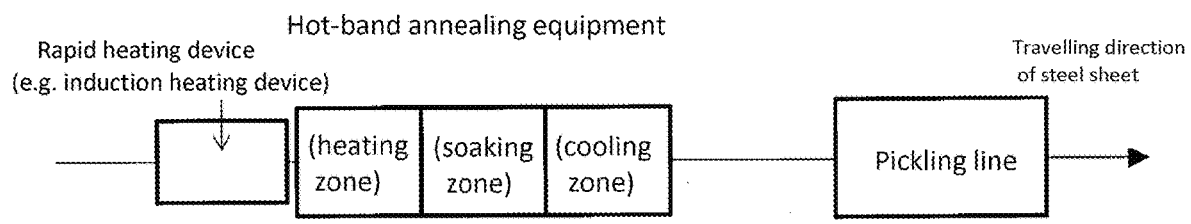

HOT-BAND ANNEALING EQUIPMENT, HOT-BAND ANNEALING METHOD AND DESCALING METHOD FOR SI-CONTAINING HOT ROLLED STEEL SHEET

CROSS REFERENCE TO RELATED APPLICATIONS

This is a Divisional application of U.S. application Ser. No. 16/343,217, filed Apr. 18, 2019, now abandoned, which is the U.S. National Phase application of PCT/JP2017/036766, filed Oct. 11, 2017, which claims priority to Japanese Patent application No. 2016-205194, filed Oct. 19, 2016, the disclosures of each of these applications being incorporated herein by reference in their entireties for all purposes.

FIELD OF THE INVENTION

This invention relates to a hot-band annealing equipment, a hot-band annealing method and a descaling method, and more particularly to an equipment and a method for performing a hot-band annealing of a Si-containing hot rolled steel sheet containing a large amount of Si as a raw material for a grain-oriented electrical steel sheet, a non-oriented electrical steel sheet, a high-strength cold rolled steel sheet or the like, and a descaling method of the Si-containing hot rolled steel sheet after the hot-band annealing.

BACKGROUND OF THE INVENTION

Electrical steel sheets mainly used as an iron core material of electric equipment are roughly divided into a non-oriented electrical steel sheet and a grain-oriented electrical steel sheet. Both of these steel sheets usually contain a large amount of Si or Al increasing specific resistance of steel to decrease an iron loss. The non-oriented electrical steel sheet is usually produced by melting a steel adjusted to a predetermined chemical composition, shaping the steel into a slab by a continuous casting method, and subjecting the slab to hot rolling or the like, hot-band annealing if necessary, pickling, cold rolling and finish annealing for primary recrystallization. The grain-oriented electrical steel sheet is usually produced by melting a steel adjusted to a predetermined chemical composition, shaping the steel into a slab by a continuous casting method or the like, and subjecting the slab to hot rolling, hot-band annealing if necessary, pickling, cold rolling, primary recrystallization annealing that also works as decarburization annealing, application of an annealing separator and finish annealing for secondary recrystallization.

The hot-band annealing is conducted by subjecting the steel sheet after the hot rolling (hot rolled sheet) to an annealing to resolve insufficient recrystallization of the hot rolled sheet and to coarsen or regulate crystal grains before the cold rolling so that the texture of the steel sheet before the cold rolling can be improved into favorable one for magnetic properties thereof or ridging can be prevented.

When the steel sheet with residual oxidized scale formed on the surface by the hot rolling or hot-band annealing is subjected to cold rolling, the oxidized scale is pushed into the steel sheet surface by rolling rolls to make the unevenness of the steel sheet surface severe, or the stripped oxidized scale is adhered to the surface of the roll by deposition and transferred to the steel sheet surface to cause surface defects, whereby the surface quality of a final product is substantially damaged. The pickling is a process for removing the oxidized scale from the surface of the steel sheet before the cold rolling (descaling process) and is an inevitable process in the production of not only a hot rolled steel sheet for an electrical steel sheet but also a steel sheet to be cold rolled. As the pickling solution is usually used any one of hydrochloric acid, sulfuric acid, hydrofluoric acid and a mixed acid of these acids.

The oxidized scale of the hot rolled steel sheet as a raw material for the electrical steel sheet or high-strength cold rolled steel sheet containing a large amount of Si or Al is composed of outer scales such as FeO, $Fe_3O_4$, $Fe_2O_3$ and the like formed by the diffusion of Fe from the inside of the steel sheet toward the outside, and subscales comprised of Si-based oxides such as $SiO_2$ and $Fe_2SiO_4$ and $Al_2O_3$ formed by the diffusion of oxygen from the outside of the steel sheet into the inside as shown in FIG. 1. It is known that the oxidized scale is poor in the descaling property, and particularly, the subscale containing $Al_2O_3$ is extremely poor in the descaling property. Therefore, the descaling of the Si-containing hot rolled steel sheet is frequently performed by combining a light draft rolling with a mechanical descaling such as roller levelling, tension levelling, shot blasting or the like before the pickling as shown in FIG. 2(*a*).

There are two methods for improving the descaling property of the Si-containing hot rolled steel sheet, one of which is a method of suppressing the generation of the oxidized scale itself, while the other is a method of promoting the stripping of the oxidized scale.

As the former method of suppressing the generation of the oxidized scale, for example, Patent Literature 1 discloses a method of producing a silicon steel substrate comprising a steelmaking process, a hot rolling process and a normalizing process using a normalizing furnace with a non-oxidation heating furnace part provided with three or more furnace zones, wherein an energy supply rate in the furnace zone used in the non-oxidation heating furnace part is adjusted within a range of 15-95% and an excess factor $\alpha$ (a rate of an actual combustion air amount to a theoretical combustion air amount) in the non-oxidation heating furnace part is adjusted within a range of $0.8 \leq \alpha < 1.0$ to prevent the formation of a high-density oxide in the normalizing process. In this method, however, the temperature distribution of the heating furnace is made non-uniform by the adjustment of the energy supply rate or the excess factor $\alpha$, so that there is a problem that it is difficult to perform an adequate heating in an actual operation.

As the latter method of promoting stripping of the oxidized scale is a method of adopting the aforementioned mechanical descaling such as shot blasting, tension levelling or the like, but there is a problem that the steel sheet containing a large amount of Si is easily broken to cause serious operation troubles because it is a hard material. Moreover, there is a method of increasing the concentration or temperature of the pickling solution. However, it has a problem that an over-pickling is caused when a threading rate is decreased for some reason to badly affect the surface quality or deteriorate the working environment in the pickling.

Patent Literature 2 proposes a method for improving the descaling property by heating the steel sheet before pickling with an induction heating device so as to have cracking of the oxidized scale reach to the surface of the base iron and thereafter blowing a pickling solution into the crack. Patent Literature 3 discloses a method wherein a scale breaker is disposed before a pickling tank and a plurality of deflector rolls, jetting nozzles and an induction heating device are disposed in the pickling tank to cause cracking in the scale by the scale breaker and thereafter the crack is opened by bending using the deflector rolls and a pickling solution is sprayed to the opening and the temperature of the steel sheet is increased by induction heating to promote the chemical reaction.

PATENT LITERATURES

Patent Literature 1: JP-A-2015-511995
Patent Literature 2: JP-A-S61-079790
Patent Literature 3: JP-A-H09-078273

SUMMARY OF THE INVENTION

In the method disclosed in Patent Literature 2, however, when the steel sheet is heated before the pickling, there is a problem that the temperature of the pickling solution is increased to generate harmful acid fume or the steel sheet is excessively pickled or the durability of the pickling tank is decreased. In the method disclosed in Patent Literature 3, it is necessary to dispose a heating equipment, roll, nozzle and so on in the pickling tank, and there is a problem that the service life of the facility equipment is shortened or the maintenance thereof is difficult.

The present invention is made in view of the aforementioned problems inherent to the conventional techniques, and the object thereof is to provide a hot-band annealing equipment capable of improving a descaling property of a Si-containing hot rolled steel sheet without requiring the mechanical descaling or the heating of the steel sheet in the pickling process and to propose a hot-band annealing method and a descaling method using the above equipment.

The inventors have focused the heating method from a viewpoint that it is important to increase the stripping property of the oxidized scale in order to improve the descaling property and made various studies to solve the above problems. As a result, they have found out that since the oxidized scale layer on the steel sheet surface has a thermal expansion coefficient different from that of the base iron, thermal stress is caused resulting from the difference of the thermal expansion amounts between the oxidized scale and the base iron when heated to the same temperature as the base iron, and that a temperature difference is caused between the base iron and the oxidized scale due to the difference of the thermal conductivity when an induction heating or an electric heating, which causes heat generation of the steel sheet itself, is adopted instead of radiation heating, which heats the steel sheet from the outside thereof, as the method of heating the steel sheet, and that when the steel sheet is rapidly heated by using the induction heating or the electric heating, the temperature difference between the base iron and the steel sheet becomes larger to generate a remarkably large thermal stress between the oxidized scale and the base iron and hence cracking is caused in the oxidized scale formed on the steel sheet surface to improve the stripping property. Thus, the inventors have examined the application of the rapid heating in the process of subjecting the hot rolled steel sheet to hot-band annealing and found out that it is very effective for the improvement of the decaling property, and as a result the invention has been accomplished.

That is, according to an embodiment of the present invention is a hot-band annealing equipment provided with a heating zone, a soaking zone and a cooling zone for subjecting a Si-containing hot rolled steel sheet to a hot-band annealing, characterized in that a rapid heating device is disposed at an upper stream side of the heating zone and/or near the inlet side of the heating zone.

The hot-band annealing equipment according to an embodiment of the invention is characterized in that the rapid heating device is an induction heating device or an electric heating device.

Also, according to an embodiment of the invention is a hot-band annealing method by subjecting a Si-containing hot rolled steel sheet to hot-band annealing using the aforementioned hot-band annealing equipment, characterized in that the Si-containing hot rolled sheet is heated by not lower than 50° C. at a heating rate of not less than 15° C./s by using the rapid heating device.

The hot-band annealing method according to an embodiment of the invention is characterized in that a start temperature for heating the Si-containing hot rolled sheet by using the rapid heating device is in a range of room temperature to 700° C.

The invention according to an embodiment is a descaling method characterized by subjecting the Si-containing hot rolled steel sheet after the hot-band annealing in the aforementioned method to pickling without conducting a mechanical descaling.

The invention according to an embodiment is a descaling method characterized by subjecting the Si-containing hot rolled steel sheet after the hot-band annealing in the aforementioned method to pickling after a mechanical descaling.

The Si-containing hot rolled steel sheet to be targeted in the descaling method according to an embodiment of the invention is characterized by containing not less than 1.0 mass % of Si.

The Si-containing hot rolled steel sheet to be targeted in the descaling method according to an embodiment of the invention is characterized by being a raw material for an electrical steel sheet.

According to an embodiment of the invention, the rapid heating device is disposed in the equipment for subjecting a Si-containing hot rolled steel sheet to hot-band annealing to conduct a rapid heating at not less than a predetermined heating rate and by not less than a predetermined temperature rising amount, whereby cracking is introduced in the oxidized scale to improve the stripping property, so that it becomes possible to remove the oxidized scale from the steel sheet surface only by pickling without conducting a mechanical descaling.

According to an embodiment of the present invention, therefore, it is possible not only to increase the pickling efficiency of the Si-containing hot rolled steel sheet and largely simplify the pickling process but also to stably produce a product having an excellent surface quality.

In an embodiment of the invention, the heating device used in the rapid heating of the steel sheet acts as a part of the heating zone in the hot-band annealing equipment and contributes to the improvement of the thermal energy efficiency.

BRIEF DESCRIPTION OF DRAWINGS

FIGS. 1(*a*) and 1(*b*) are views illustrating a cross-sectional structure of an oxidized scale formed on a surface of a Si-containing hot rolled steel sheet.

FIGS. 2(*a*) and 2(*b*) are a view showing an equipment line of an embodiment of the present invention and a view showing an equipment line of the conventional technique for comparison, respectively.

DETAILED DESCRIPTION OF EMBODIMENTS OF THE INVENTION

Figure 3:
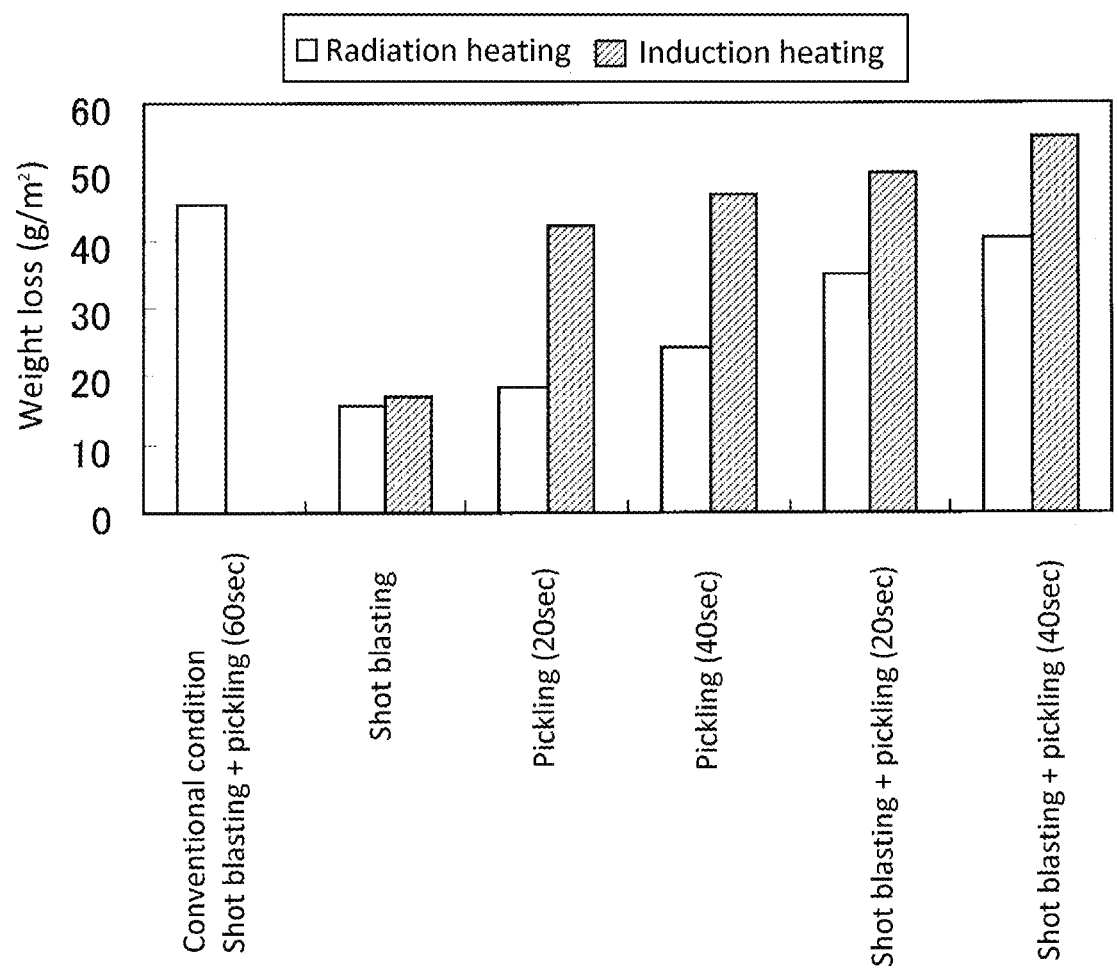
FIG. 3 is a view showing a weight loss of a Si-containing hot rolled steel sheet subjected to a mechanical descaling or pickling after hot-band annealing for comparison.

The inventors have focused on an influence of the difference among the heating methods of the steel sheet, i.e., the difference between a radiation heating for slowly heating the steel sheet from the outside and an induction heating or a direct electric heating for rapidly heating the steel sheet from the inside upon the descaling property, from a viewpoint that it is important to increase the stripping property of the oxidized scale in order to improve the descaling property of the Si-containing hot rolled sheet as previously mentioned.

It is due to the fact that the oxidized scale formed on the surface of the hot rolled steel sheet is composed of plural layers having different chemical compositions as shown in FIG. 1, but each of these layers has a thermal expansion coefficient largely different from that of the base iron, so that a thermal stress is caused resulting from the difference of the thermal expansion amounts between the scale and the base iron, even when the scale is heated to the same temperature as the base iron.

In the radiation heating for heating the steel sheet from the outside, since the oxidized scale is first heated and then the steel sheet is heated, a large temperature difference is not caused therebetween. On the other hand, when the steel sheet is heated by the induction heating or the like, heat generation is caused in the steel sheet itself to produce a temperature difference between the oxidized scale and the base iron. Moreover, since the rapid heating can be conducted in the induction heating or the like, the temperature difference between the oxidized scale and the base iron is further increased as compared to the slow heating by thermal conduction such as the radiation heating. As a result, a large thermal stress resulting from the difference of the thermal expansion is caused between the oxidized scale and the base iron to generate a great number of fine cleavages (cracks) in the oxidized scale, whereby it is expected to promote the stripping of the oxidized scale and improve the descaling property.

The inventors have conducted the following experiments to confirm the validity of the above idea.

Experiment 1

A test specimen is taken out from a hot rolled steel sheet for a non-oriented/grain-oriented electrical steel sheet containing 3.0 mass % of Si (hot rolled sheet) and subjected to a heat treatment simulating hot-band annealing at 1050° C. for 60 seconds for the hot rolled sheet. The test specimen is rapidly heating from room temperature (20° C.) up to 30° C., 50° C., 70° C., 100° C., 400° C. and 700° C. at a heating rate of 50° Us with a solenoid-type induction heating device, heated from the each temperature after the rapid heating to 1050° C. with a direct type heating furnace (a radiation type heating furnace), held for 60 seconds, and then cooled at a rate of 25° C./s in the heat treatment. The atmosphere in the heat treatment is set to be a nitrogen atmosphere.

Next, the test specimen after the heat treatment is subjected to a pickling by immersing in an aqueous solution having 8 mass % of HCl kept at a temperature of 80° C. for 60 seconds, and a stripping condition of an oxidized scale from the steel sheet surface after the pickling is visually observed to evaluate the descaling property.

The descaling property is evaluated as superior (○) when the surface appearance after the descaling is equal to or superior to that by the conventional descaling method (mechanical descaling and pickling) for the Si-containing hot rolled steel sheet, as inferior (Δ) when the surface appearance is inferior to that by the conventional descaling method (mechanical descaling and pickling) but superior to that by the conventional pickling only, and as bad (x) when the surface appearance is equal to that by the conventional pickling only.

The evaluation results are shown in Table 1. As seen from these results, when the steel sheet is rapidly heated at a heating rate of 50° C./s by the induction heating, the descaling property only by the pickling is improved as compared to the conventional condition by the combination of the mechanical descaling and pickling, by setting the temperature rising amount to not lower than 50° C.

TABLE 1

| Heating temperature of steel sheet (° C.) | 30 | 50 | 70 | 100 | 400 | 700 |
|---|---|---|---|---|---|---|
| Temperature rising amount (° C.) from room temperature (20° C.) | 10 | 30 | 50 | 80 | 380 | 680 |
| Evaluation of descaling property | x | Δ | ○ | ○ | ○ | ○ |

Experiment 2

Next, the influence of the heating rate for the steel sheet on the descaling property is evaluated based on the results of Experiment 1 by changing the heating rate to five levels of 5° C./s, 10° C./s, 15° C./s, 20° C./s, and 50° C./s when the temperature rising amount from room temperature (20° C.) is 50° C., or the heating temperature is 70° C. (constant) and when the other conditions and the evaluation standard of the descaling property are the same as in Experiment 1.

The results are shown in Table 2. As seen from these results, when the temperature rising amount by the induction heating is set to 50° C. (constant), the descaling property only by the pickling is improved to a level equal to or more than that by the conventional condition combining mechanical descaling and pickling by rapidly heating at a heating rate of not less than 15° C./s.

TABLE 2

| Heating temperature of steel sheet (° C.) | 70 | 70 | 70 | 70 | 70 |
|---|---|---|---|---|---|
| Temperature rising amount (° C.) from room temperature (20° C.) | 50 | 50 | 50 | 50 | 50 |
| Heating rate (° C./s) | 5 | 10 | 15 | 20 | 50 |
| Evaluation of descaling property | x | Δ | ○ | ○ | ○ |

As seen from the results in Experiment 1 and Experiment 2, when the rapid heating is conducted by induction heating in the heating process of the hot-band annealing, an effect of improving the descaling property to be equal to or more than that when the mechanical descaling is applied before pickling is obtained by making the heating rate not less than 15° C./s and making the temperature rising amount not lower than 50° C. Therefore, it becomes clear that the descaling property equal to or more than that by the conventional method can be achieved when the hot rolled sheet is heated so as to satisfy the above condition in the heating process of the hot-band annealing even when the mechanical descaling which was conducted before pickling is omitted.

The present invention is based on the above new knowledge.

The present invention will be explained in detail below.

The hot rolled sheet targeted by the present invention is preferable to contain not less than 1.0 mass % of Si. When it is less than 1.0 mass %, the decrease of the descaling property by the pickling is not remarkable, so that the mechanical descaling is not necessary before the pickling. However, an embodiment of the present invention is obviously applicable to a hot rolled steel sheet containing less than 1.0 mass % of Si. Moreover, the upper limit of Si is not particularly defined, but it is about 5.0 mass % from a viewpoint of ensuring the threading property to a production line. Preferably, it is within a range of 1.8 to 4.0 mass %.

As the hot rolled sheet containing Si in the above range are concretely included a hot rolled steel sheet as a raw material for a non-oriented electrical steel sheet or a grain-oriented electrical steel sheet and a hot rolled steel sheet as a raw material for a high-strength cold rolled steel sheet or a high-strength surface-treated steel sheet, each of which is required to have an excellent surface property.

The hot-band annealing equipment according to the present invention is preferable to be a continuous annealing furnace. It is because the rapid heating is impossible in a batch type (box-type) annealing furnace.

The heating device used in the rapid heating is preferable to be an induction heating device or an electric heating device capable of generating heat from the steel sheet itself and conducting the rapid heating. Moreover, the induction heating device is preferable to be a solenoid-type device rather than a transverse-type device because the steel sheet is uniformly heated in the widthwise direction by using the solenoid-type device.

As seen from Experiment 1 and Experiment 2, it is necessary to conduct the rapid heating of the steel sheet at a heating rate of not less than 15° C./s and at a temperature rising amount of not lower than 50° C. in order to improve the descaling property of the Si-containing hot rolled steel sheet in the hot-band annealing. Here, the heating rate is preferably not less than 30° C./s, more preferably not less than 50° C./s from a viewpoint of increasing the temperature difference between the base iron and the oxidized scale. Also, the temperature rising amount in the rapid heating is preferably not lower than 80° C., more preferably not lower than 100° C. from the same viewpoint. However, when the end temperature in the rapid heating exceeds 700° C., a large current is necessary in the heating or the heating device becomes large scale. When the steel sheet temperature exceeds a Curie point in the heating by using a solenoid-type induction heating, the heating efficiency is violently decreased, so that the upper limit of the rapid heating (end temperature) is preferable to be about 700° C. More preferably, it is not higher than 680° C.

The position of disposing the rapid heating device in the equipment for the hot-band annealing is preferable to be an upstream side of the heating zone (just before the heating zone) and/or in the heating zone. When the rapid heating device is disposed just before the heating zone, there is caused no problem, but when it is disposed in the heating zone, it is preferable to be disposed in a zone having a temperature inside the furnace of not higher than 700° C. in the inlet side of the heating zone (the most upstream side), from a viewpoint of preventing thermal damage of an induction heating coil or a conducting roll. Thus, the temperature range for disposing the rapid heating device, or the start temperature for rapidly heating the steel sheet is preferable to be within a range of room temperature to 700° C. It is more preferably a range of room temperature to 620° C., further preferably a range of room temperature to 600° C.

A large number of fine cracks are introduced into the oxidized scale formed on the surface of the Si-containing hot rolled steel sheet subjected to the rapid heating after the hot-band annealing to improve the stripping property of the oxidized scale, so that the descaling property equal to or more than that when the mechanical descaling is performed can be obtained even when the mechanical descaling is not performed before pickling. In the pickling process of the Si-containing hot rolled steel sheet, therefore, the mechanical descaling process before the pickling has been necessary in the conventional method as shown in FIG. 2(a), while it is possible to omit the mechanical descaling process by disposing the rapid heating device just before the heating zone in the hot-band annealing equipment, for example, as shown in FIG. 2(b). FIG. 2(b) shows an example that the rapid heating device is disposed just before the heating zone, but it may be disposed in a low temperature region at the upstream side of the heating zone. Here, the mechanical descaling may be obviously performed in order to further improve the pickling property.

EXAMPLE

A test specimen having a width of 100 mm and a length of 300 mm is taken out from a hot rolled steel sheet for an electrical steel sheet containing 3.5 mass % of Si and having a thickness of 2.5 mm and subjected to a heat treatment under the following conditions A and B simulating hot-band annealing. The atmosphere in the annealing under each of the conditions A and B is a N2 atmosphere.

<Hot-Band Annealing Condition>

Condition A: The steel sheet is heated from room temperature (20° C.) to 1050° C. at 10° C./s, held at 1050° C. for 40 seconds and then cooled at a rate of 25° C./s in an experimental furnace simulating a direct-type side burner heating furnace (radiation heating furnace).

Condition B: The steel sheet is rapidly heated from room temperature (20° C.) to 700° C. at 60° C./s with an induction heating device, further heated from 700° C. to 1050° C. at 20° C./s with the radiation heating furnace used in the condition A, held at 1050° C. for 40 seconds and then cooled at 25° C./s.

Next, the test specimen after the hot-band annealing is divided into two equal parts in the longitudinal direction. One part is subjected to a mechanical descaling (shot blasting) under the following condition, and the other part is not subjected to the mechanical descaling.

<Shot Blasting Condition>

Kind of blasting material: steel shot grains with a particle size of 0.35±0.15 mm, a density of 7.5 g/cm$^3$ and a hardness of 40-50 Rc Blasting pressure (speed): 12.5 kg/m$^2$ Blasting angle: 90°

Blasting amount×time: 1000 (g/s)×15 (s)

Thereafter, the test specimen divided into two equal parts in the longitudinal direction is further divided into two equal parts in the widthwise direction. One specimen is subjected to descaling by pickling under the following condition a and the other is descaled by pickling under the following condition b.

<Pickling Condition>

Condition a: Immersion in an aqueous solution containing 8 mass % of HCl at 80° C. for 20 seconds Condition b: Immersion in an aqueous solution containing 8 mass % of HCl at 80° C. for 40 seconds.

For comparison, when the mechanical descaling is performed before pickling in the conventional method, the time required for descaling (pickling time) in the pickling under the above condition is about 60 seconds.

FIG. 3 shows a weight loss (g/m²) of the test specimen in each stage after the mechanical descaling and after the pickling, after the hot-band annealing is conducted.

As seen from these results, the test specimen that is only subjected to the pickling without the mechanical descaling has the descaling property equal to that subjected to the mechanical descaling, by rapidly heating the specimen to 700° C. by the induction heating in the heating process of the hot-band annealing. Also, the oxidized scale is removed sufficiently from the surface in the test specimen rapidly heated to 700° C. by the induction heating even when the pickling time is shortened from the usual time of 60 seconds to 40 or 20 seconds. According to the present invention, therefore, it is possible not only to omit the mechanical descaling from the descaling process but also to shorten the pickling time.

The method according to embodiments of the present invention provides the effect of improving the descaling property regardless of the presence or absence of Si content, so that it is applicable to not only the Si-containing hot rolled steel sheet for an electrical steel sheet or high-strength steel sheet but also a general-purpose hot rolled steel sheet containing no Si.

The invention claimed is:

1. A hot-band annealing method comprising:
    subjecting a Si-containing hot rolled steel sheet, having an oxidized scale formed on a surface of the steel sheet by hot rolling, to hot-band annealing with a hot-band annealing equipment provided with a heating zone, a soaking zone and a cooling zone, characterized in that
    (i) a rapid heating device is disposed at an upper stream side of the heating zone and/or an inlet side of the heating zone, and
    (ii) a start temperature for heating the Si-containing hot-rolled steel sheet, having the oxidized scale, in the rapid heating device is in a range of room temperature to 700° C. and the Si-containing hot rolled steel sheet, having the oxidized scale, is heated by not lower than 50° C. at a heating rate of not less than 15° C./s by using the rapid heating device.

2. The hot-band annealing method according to claim 1, wherein the rapid heating device is an induction heating device or an electric heating device.

3. A descaling method, characterized by subjecting the Si-containing hot rolled steel sheet, after the hot-band annealing by the method according to claim 1, to pickling without conducting mechanical descaling.

4. A descaling method, characterized by subjecting the Si-containing hot rolled steel sheet, after the hot-band annealing by the method according to claim 2, to pickling without conducting mechanical descaling.

5. A descaling method, characterized by subjecting the Si-containing hot rolled steel sheet, after the hot-band annealing by the method according to claim 1, to pickling after being subjected to mechanical descaling.

6. A descaling method, characterized by subjecting the Si-containing hot rolled steel sheet, after the hot-band annealing by the method according to claim 2, to pickling after being subjected to mechanical descaling.

7. The descaling method according to claim 3, wherein the Si-containing hot rolled steel sheet contains not less than 1.0 mass % of Si.

8. The descaling method according to claim 4, wherein the Si-containing hot rolled steel sheet contains not less than 1.0 mass % of Si.

9. The descaling method according to claim 5, wherein the Si-containing hot rolled steel sheet contains not less than 1.0 mass % of Si.

10. The descaling method according to claim 6, wherein the Si-containing hot rolled steel sheet contains not less than 1.0 mass % of Si.

\* \* \* \* \*